(12) United States Patent
Fraser et al.

(10) Patent No.: US 12,541,602 B2
(45) Date of Patent: Feb. 3, 2026

(54) MACHINE LEARNED MALICIOUS PREDICTIONS

(71) Applicant: CrowdStrike, Inc., Sunnyvale, CA (US)

(72) Inventors: Joshua Fraser, Wilston (AU); Joseph Leo Faulhaber, Bozeman, MT (US)

(73) Assignee: CrowdStrike, Inc., Sunnyvale, CA (US)

( * ) Notice: Subject to any disclaimer, the term of this patent is extended or adjusted under 35 U.S.C. 154(b) by 113 days.

(21) Appl. No.: 18/343,697

(22) Filed: Jun. 28, 2023

(65) Prior Publication Data
US 2025/0007941 A1 Jan. 2, 2025

(51) Int. Cl.
| | |
|---|---|
| *G06F 21/57* | (2013.01) |
| *G06F 21/55* | (2013.01) |
| *H04L 9/40* | (2022.01) |
| *H04L 41/16* | (2022.01) |

(52) U.S. Cl.
CPC .......... *G06F 21/577* (2013.01); *G06F 21/554* (2013.01); *H04L 41/16* (2013.01); *H04L 63/1433* (2013.01); *H04L 63/1491* (2013.01)

(58) Field of Classification Search
CPC ...... G06F 21/577; G06F 21/554; G06F 21/57; H04L 63/1491; H04L 63/1416; H04L 63/1425; H04L 63/1441; H04L 63/1433; H04L 63/20
See application file for complete search history.

(56) References Cited

U.S. PATENT DOCUMENTS

| | | |
|---|---|---|
| 9,516,053 B1 | 12/2016 | Muddu et al. |
| 10,366,233 B1 | 7/2019 | Feinman et al. |
| 10,372,913 B2 | 8/2019 | Harms et al. |
| 10,642,719 B1 | 5/2020 | Balasubramanian et al. |
| 10,841,333 B2 | 11/2020 | Levy et al. |
| 10,984,105 B2 | 4/2021 | Gronat et al. |
| 11,113,398 B2 | 9/2021 | Harms et al. |
| 11,816,223 B1* | 11/2023 | Vandeventer ......... G06F 21/577 |
| 2015/0047032 A1* | 2/2015 | Hannis ................ H04L 63/1491 726/23 |

(Continued)

OTHER PUBLICATIONS

Extendend European Search Report mailed Oct. 10, 2024 in Application No. 24183705.3, 8 pages.

(Continued)

*Primary Examiner* — Kyung H Shin
(74) *Attorney, Agent, or Firm* — Law Office of Scott P. Zimmerman, PLLC

(57) ABSTRACT

A cloud-based cyber security detection prediction service pre-screens cyber security detections reported by endpoint client devices. The endpoint client devices report the cyber security detections to a cloud-computing environment providing the cloud-based cyber security detection prediction service. The cyber security detections are compared to a cyber security assessment profile generated by a machine learning model trained using human expert cyber security assessments. The human expert cyber security assessments were applied by human cyber security subject matter experts scrutinizing historical detection data. The cloud-based cyber security detection prediction service thus provides a much faster cyber security prediction based on human expertise.

20 Claims, 12 Drawing Sheets

(56) References Cited

U.S. PATENT DOCUMENTS

| | | |
|---|---|---|
| 2018/0248905 A1 | 8/2018 | Côté et al. |
| 2019/0108470 A1 | 4/2019 | Jain |
| 2021/0256401 A1 | 8/2021 | Elkind |
| 2021/0297427 A1 | 9/2021 | Narula et al. |
| 2022/0224724 A1* | 7/2022 | Bazalgette ............ G06F 21/554 |
| 2022/0225101 A1 | 7/2022 | Fellows |
| 2023/0259891 A1 | 8/2023 | Seck et al. |

OTHER PUBLICATIONS

"Use case: Incident response and remediation," https://learn.microsoft.com/en-us/copilot/security/use-case-incident-response-remediation, accessed on or about Feb. 21, 2025.

"Fast, smart investigation for incident management teams," https://www.bigpanda.io/solutions/incident-management/, accessed on or about Feb. 21, 2025.

"Rubrik and Microsoft Announce Generative AI-Powered Cyber Recovery and Remediation," https://www.globenewswire.com/en/news-release/2023/06/28/2696248/0/en/Rubrik-and-Microsoft-Announce-Generative-AI-Powered-Cyber-Recovery-and-Remediation.html, accessed on or about Feb. 21, 2025.

"Extended Detection & Response (XDR)," https://heimdalsecurity.com/enterprise-security/products/extended-detection-and-response, accessed on or about Feb. 21, 2025.

Applicant's response to the Search Opinion submitted Jun. 30, 2025 for European Patent Application No. 24183705.3 , 27 pages.

* cited by examiner

MACHINE LEARNED MALICIOUS PREDICTIONS

BACKGROUND

The subject matter described herein generally relates to computers and to computer security and, more particularly, the subject matter relates to a cloud-service detection maliciousness predictor.

Cyber security threats are always increasing. Every week, a cyber security service provider may receive thousands of reports of viruses, hacks, and other malicious software (or malware). Each cyber security detection purportedly describes suspicious behavior, identity, location, or other data that may indicate malicious activity that could be impacting a device, and this malicious activity could be through the use of malware or other tools. These cyber security detections are manually inspected and assessed by human expert analysts. The human expert analysts scrutinize each cyber security detection for malware, for malicious user activity, and/or for malicious use of legitimate software. The human expert analysts confirm whether the cyber security detection is truly suspicious (a true positive report) or harmless activity (a false positive report). Needless to say, human inspection and assessment requires great skill and much time. As the volume of cyber security detections is always increasing, the human expert analysts struggle to manage the volume.

SUMMARY

A cloud-based cyber security detection prediction service detects and pre-screens cyber security detections. The cloud-based cyber security detection prediction service monitors the cyber security detections reported to a cloud-computing environment. The cyber security detections may be reported by cyber security sensory agents executed by client devices. The cloud-based cyber security detection prediction service compares the cyber security detections to a cyber security assessment profile generated by a machine learning model. The machine learning model is trained using cyber security assessments conducted by human expert cyber security analysts. These human expert cyber security analysts scrutinize the thousands of weekly cyber security detections. The human expert cyber security analysts are specially-trained, subject matter experts in detecting malicious behavior, malicious usage, and malware infecting client devices. As the human expert cyber security analysts scrutinize the thousands of weekly cyber security detections, the cloud-based cyber security detection prediction service comprehensively stores and logs the details of each cyber security assessment conducted by the human expert cyber security analysts. The cloud-based cyber security detection prediction service may thus train the machine learning model using these human expert cyber security assessments that were historically collected over time and over millions of cyber security detections. By comparing any current cyber security detection to a cyber security detection assessment profile generated by the machine learning model, the cloud-based cyber security detection prediction service generates quick and accurate detection predictions. The cloud-based cyber security detection prediction service predicts whether any cyber security detection is truly suspicious (a true positive report) or is harmless activity (a false positive report). The cloud-based cyber security detection prediction service enables an elegantly simple and fast pre-screening of the cyber security detections. The cloud-based cyber security detection prediction service thus provides much faster detection and assessment that easily manages the ever-increasing reports of suspiciousness from the client devices.

BRIEF DESCRIPTION OF THE SEVERAL VIEWS OF THE DRAWINGS

The features, aspects, and advantages of malicious prediction are understood when the following Detailed Description is read with reference to the accompanying drawings, wherein.

DETAILED DESCRIPTION

Figure 1:
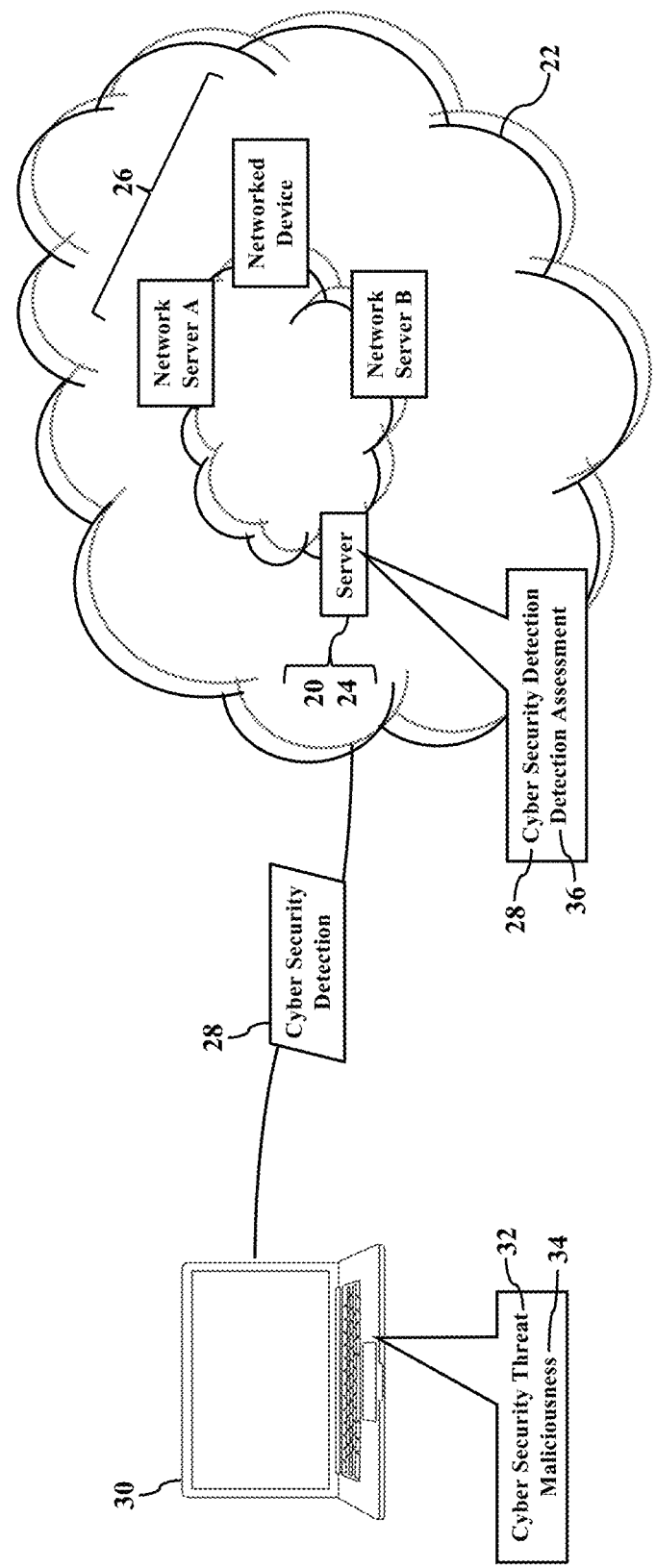
FIGS. 1-3 illustrate some examples of assessing malware detections reported by clients.

Some examples relate to detection and assessment of malicious computer activities, behaviors, and usage. A cloud-based cyber security detection prediction service monitors cyber security detections reported to a cloud-computing environment. The cyber security detections are reported by cyber security sensory agents downloaded to smartphones, computers, servers, and other endpoint devices. Each cyber security sensory agent monitors its endpoint device for viruses, hacks, suspicious usage, and malicious software (or malware). Should the cyber security sensory agent detect suspicious behavior, identity, location, or other data, the cyber security sensory agent sends a cyber security detection to the cloud-computing environment. When the cloud-based cyber security detection prediction service receives the cyber security detection, the cloud-based cyber security detection prediction service submits the cyber security detection to a cyber security assessment profile generated by a machine learning model. The cyber security assessment profile statistically reflects thousands or even millions of cyber security assessments conducted by human expert cyber security analysts. These human expert cyber security analysts scrutinize the thousands of cyber security detections reported each week. The human expert cyber security analysts are thus subject matter experts in detecting malicious behavior, identity, location, and coding. The cloud-based cyber security detection prediction service trains the machine learning model using human expert cyber security assessments that were historically collected over time and over millions of cyber security detections. Because the machine learning model is trained using these human expert cyber security assessments, the cyber security assessment profile (generated by the machine learning model) reflects the very accurate, deep-dive analyses performed by the human expert cyber security analysts. The cyber security assessment profile, in other words, may describe normal or harmless behaviors, identities, locations, or other data as determined by the human expert cyber security analysts. The cyber security assessment profile, however, may additionally or alternatively describe abnormal or unexpected behaviors, identities, locations, or other data as also determined by the human expert cyber security analysts. So, by comparing the cyber security detections to the cyber security assessment profile, the cloud-based cyber security detection prediction service quickly and accurately predicts whether any cyber security detection is truly malicious (a true positive report) or is harmless activity (a false positive report). The cloud-based cyber security detection prediction service thus provides much faster cyber security assessment and easily manages the ever-increasing reports of maliciousness from the client devices.

Cloud services cyber security detection prediction will now be described more fully hereinafter with reference to the accompanying drawings. Cloud services cyber security detection prediction, however, may be embodied in many different forms and should not be construed as limited to the examples set forth herein. These examples are provided so that this disclosure will be thorough and complete and fully convey cloud services malware assessment to those of ordinary skill in the art. Moreover, all the examples of cloud services malware assessment are intended to encompass both structural and functional equivalents thereof. Additionally, it is intended that such equivalents include both currently known equivalents as well as equivalents developed in the future (i.e., any elements developed that perform the same function, regardless of structure).

Figure 2:
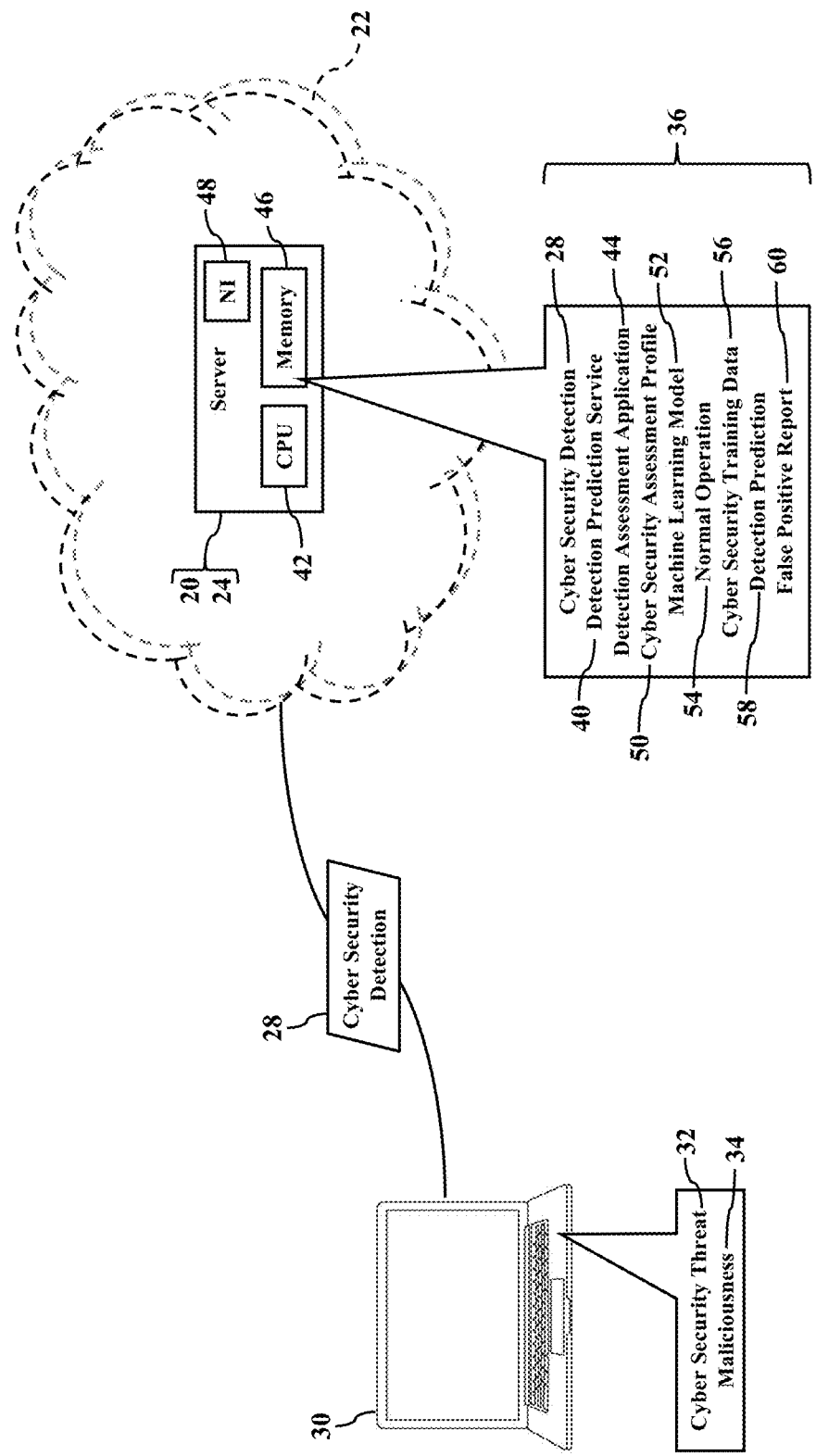
Figure 3:
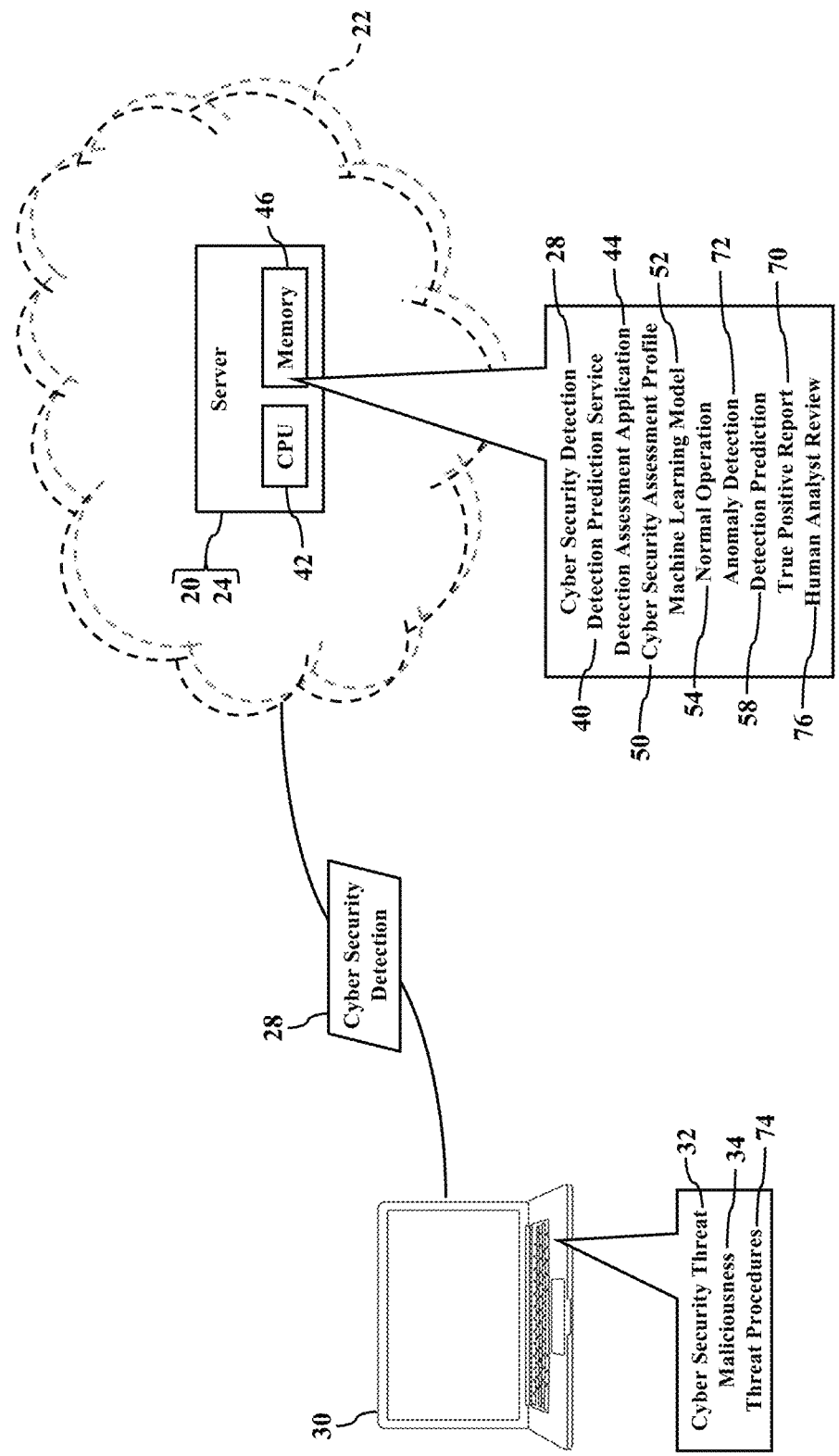

FIGS. 1-3 illustrate some examples of assessing detections reported by clients. A computer 20 operates in a cloud-computing environment 22. FIG. 1 illustrates the computer 20 as a server 24. The computer 20, though, may be any processor-controlled device, as later paragraphs will explain. In this example, the server 24 communicates via the cloud-computing environment 22 (e.g., public Internet, private network, and/or hybrid network) with other servers, devices, computers, or other networked members 26 operating within, or affiliated with, the cloud-computing environment 22. The server 24 is programmed to pre-screen or assess cyber security detections 28 reported by a client device 30. That is, when the client device 30 detects suspicious behavior, unusual login/location context, or other potential cyber security threat 32 (as later paragraphs will explain in greater detail), the client device 30 sends the cyber security detection 28 to the cloud-computing environment 22. The cyber security detection 28 alerts or notifies the cloud-computing environment 22 that the client device 30 has detected the potential cyber security threat 32. The client device 30, in other words, has detected a program, process, communication, behavior, location, or some other evidence that may indicate maliciousness 34 (such as malicious behavior, usage, or software/malware). The client device 30 may then notify the cloud-computing environment 22 for a fuller, more detailed detection assessment 36.

FIGS. 2-3 illustrate some examples of the detection assessment 36. When the cloud-computing environment 22 receives the cyber security detection 28, the cloud-computing environment 22 may route the cyber security detection 28 to the server 24 for the detection assessment 36. The server 24 may thus provide a cloud-based cyber security detection prediction service 40 to the networked members 26 operating within, or affiliated with, the cloud-computing environment 22. The server 24 may also provide the cloud-based cyber security detection prediction service 40 to other clients (such as the client device 30). The server 24 has at least one hardware processor 42 (illustrated as "CPU") that executes a detection assessment application 44 stored in a memory device 46. The server 24 also has network interfaces (illustrated as "NI") 48 to multiple communications networks (such as the cloud-computing environment 22 illustrated in FIG. 1), thus allowing bi-directional communications with networked devices. When the server 24 receives the cyber security detection 28, the detection assessment application 44 may be a computer program, instruction(s), or code that instructs or causes the server 24 to preliminarily assess the cyber security detection 28.

The server 24 performs the fast and effective cyber security detection prediction service 40. When the server 24 receives the cyber security detection 28, the server 24 executes the detection assessment application 44 as a predictor engine. The server 24 may ingest the cyber security detection 28 as an input, and the detection assessment application 44 instructs the server 24 to compare the cyber security detection 28 to a cyber security assessment profile 50 generated by a machine learning model 52. The cyber security assessment profile 50 may statistically define or specify process events, communications, activities, behaviors, data values, patterns, contextual login/location, or other electronic content that have been humanly assessed as safe or normal operation 54. The cyber security assessment profile 50, in other words, may describe normal or harmless behaviors, identities, locations, or other data as determined by human cyber security subject matter experts in detecting the maliciousness 34. The cyber security assessment profile 50 may thus represent historical human analysts' confirmations or observations of information, data, bits/bytes, and/or other electronic content that is/are known to indicate normal operation 54. Whatever information or data is described by, or included with, the cyber security detection 28, that information or data may be compared to the cyber security assessment profile 50. If the electronic content represented by the cyber security detection 28 equals, matches, satisfies, lies within, or conforms to the cyber security assessment profile 50, then the detection assessment application 44 may determine that the cyber security detection 28 is safe or normal operation 54. That is, even though the client device 30 reported the cyber security detection 28 as the possible maliciousness 34, the cyber security assessment profile 50 reveals that the cyber security detection 28 is actually normal or harmless behaviors, identities, locations, or other data, as determined by the human subject matter experts in detecting the maliciousness 34. The cyber security detection 28, in other words, is a false alarm and lacks electronic content determined by the human cyber security expert analysts to be the maliciousness 34, as defined or specified by the cyber security assessment profile 50.

The server 24 may thus statistically identify the safe or normal operation 54. Because the machine learning model 52 builds the cyber security assessment profile 50, the machine learning model 52 may statistically predict a range of the safe or normal operation 54. The cyber security assessment profile 50, in other words, may specify names, processes, and/or values that describe ranges of the safe or normal operation 54, such as terms defining normal or expected process events, communications, activities, behaviors, data values, patterns, contextual login/location, or other electronic content. These terms, associated with the safe or normal operation 54, derive from the human cyber security subject matter experts scrutinizing thousands or millions of historical cyber security detections 28. As a simple example, the machine learning model 52 may generate the cyber security assessment profile 50 using Gaussian probability distributions based on cyber security training data 56 derived from the human cyber security subject matter experts. One or more standard deviations and confidence intervals may then be calculated to predict ranges of the safe or normal operation 54. As the detection assessment application 44 inspects the current cyber security detection 28, the statistical models may be used to predict that the cyber security detection 28 lies within, or deviates or differs from, the cyber security assessment profile 50.

The server 24 may generate a detection prediction 58. When any data associated with the current cyber security detection 28 conforms to the cyber security assessment profile 50, the detection assessment application 44 may thus instruct the server 24 to determine the cyber security detection 28 is the safe or normal operation 54. The server 24 may thus generate the detection prediction 58 as an output, and the detection prediction 58 determines, or predicts, that the cyber security detection 28 is actually the safe or normal operation 54. That is, even though the client device 30 reported the cyber security detection 28 as the possible maliciousness 34, the cyber security assessment profile 50 actually reveals the cyber security detection 28 to be normal or harmless processes, behaviors, identities, locations, or other data, as determined by the human cyber security subject matter experts. Because the cyber security detection 28 may be statistically described as the normal operation 54, the detection assessment application 44 may instruct the server 24 to label, sort, or classify the cyber security detection 28 as a false positive report 60. The cyber security detection 28, in simple words, is a false alarm. The detection assessment application 44 may further label, sort, or classify the cyber security detection 28 as benign, low priority, and/or not requiring further malware investigation. Urgent resources may thus be allocated to other, higher-priority detections.

As FIG. 3 illustrates, though, the cyber security detection 28 may be a true positive report 70. When the server 24 compares the cyber security detection 28 to the cyber security assessment profile 50 (as instructed by the detection assessment application 44), the cyber security detection 28 may not conform to the cyber security assessment profile 50. The data or electronic content associated with the cyber security detection 28, in other words, fails to equal, match, satisfy, or lie within the normal operation 54, as statistically defined or specified by the cyber security assessment profile 50. Because the cyber security detection 28 cannot be characterized as normal operation 54, the detection assessment application 44 may determine that the cyber security detection 28 is an outlier or anomaly detection 72. The cyber security detection 28 may thus describe abnormal, anomalous, or perhaps even harmful processes, behaviors, identities, locations, or other data. The detection assessment application 44 instructs the server 24 to generate the detection prediction 58 as an output, and the detection prediction 58 identifies the cyber security detection 28 as the outlier or anomaly detection 72. The detection assessment application 44 may further instruct the server 24 to label, sort, or classify the cyber security detection 28 as the true positive report 70 of the maliciousness 34. The detection assessment application 44 may further instruct the client device 30 to implement notification/quarantine/isolation/halt or other urgent threat procedures 74. The detection assessment application 44 may also hand-off and queue the cyber security detection 28 for a human analyst review 76 by the cyber security subject matter experts. Because the cyber security detection 28 has been screened and preliminarily assessed as the true positive report 70, the detection assessment application 44 may route the cyber security detection 28 to a human expert or group of human experts for an urgent, deep-dive analysis.

Computer functioning is greatly improved. Malicious software can ruin computer operations. The server 24 must quickly identify the maliciousness 34 to minimize damage to the client computers 30. Because the detection assessment application 44 utilizes the machine learning model 52, the cloud-based cyber security detection prediction service 40 is very fast and very simple to execute. The server 24 need merely compare the cyber security detection 28 to the ranges referenced by the cyber security assessment profile 50. The cyber security assessment profile 50 consumes little space (in bits/bytes) in the memory device 46. Moreover, because comparisons may be simple logical statements, the hardware processor 42 requires less cycles and less time to classify the cyber security detection 28. Computer resources are reduced, and less electrical power is required to test for presence of the maliciousness 34. The cloud-based cyber security detection prediction service 40 is thus very fast and very simple, allowing the server 24 to quickly assess the thousands of cyber security detections 28 reported each week. The cloud-based cyber security detection prediction service 40 thus greatly improves computer functioning of the server 24 when detecting the maliciousness 34.

Figure 4:
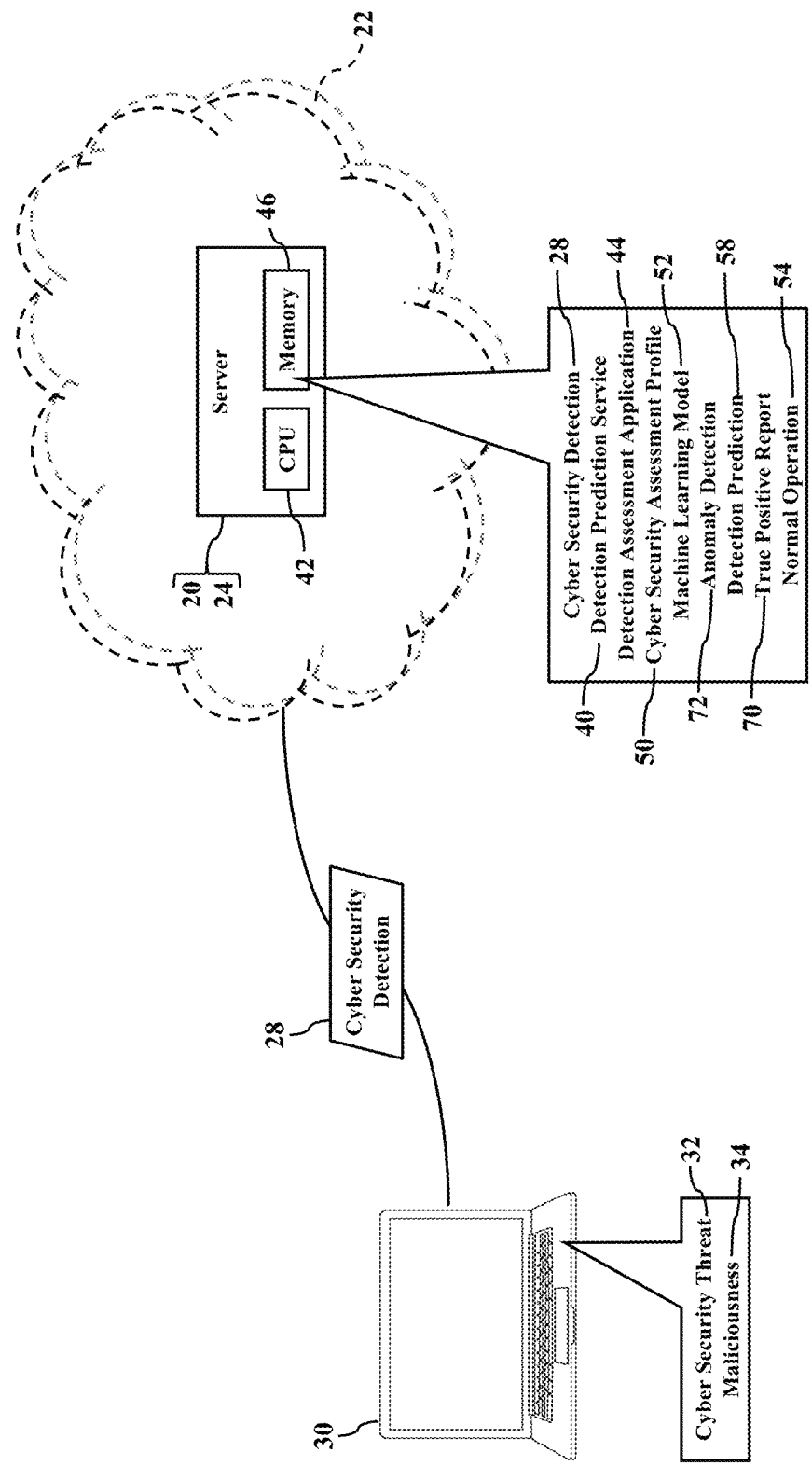
FIG. 4 illustrates examples of malware assessment services.

FIG. 4 illustrates more examples of the cyber security detection prediction service 40. Here the cyber security assessment profile 50 may be created to statistically define the outlier or anomaly detection 72. The machine learning model 52, in other words, may be trained to build a statistical model that predicts evidence of the maliciousness 34, as again derived from the human cyber security subject matter experts. The cyber security assessment profile 50 may thus statistically specify names, processes, and/or values that describe the range of the outlier or anomaly detection 72, such as terms defining known, suspicious, or unexpected process events, communications, activities, behaviors, data values, patterns, contextual login/location, or other electronic content. These terms associated with the outlier or anomaly detection 72 derive from the human cyber security subject matter experts scrutinizing thousands/millions of malware detections. If the cyber security detection 28 conforms to the cyber security assessment profile 50, then the detection assessment application 44 may instruct the server 24 to generate the detection prediction 58 and to label, sort, or classify the cyber security detection 28 as the true positive report 70 of the maliciousness 34. If, however, the cyber security detection 28 fails to conform to the cyber security assessment profile 50, then the detection assessment application 44 may instruct the server 24 to generate the detection prediction 58 and to label, sort, or classify the cyber security detection 28 as the normal operation 54.

Figure 5:
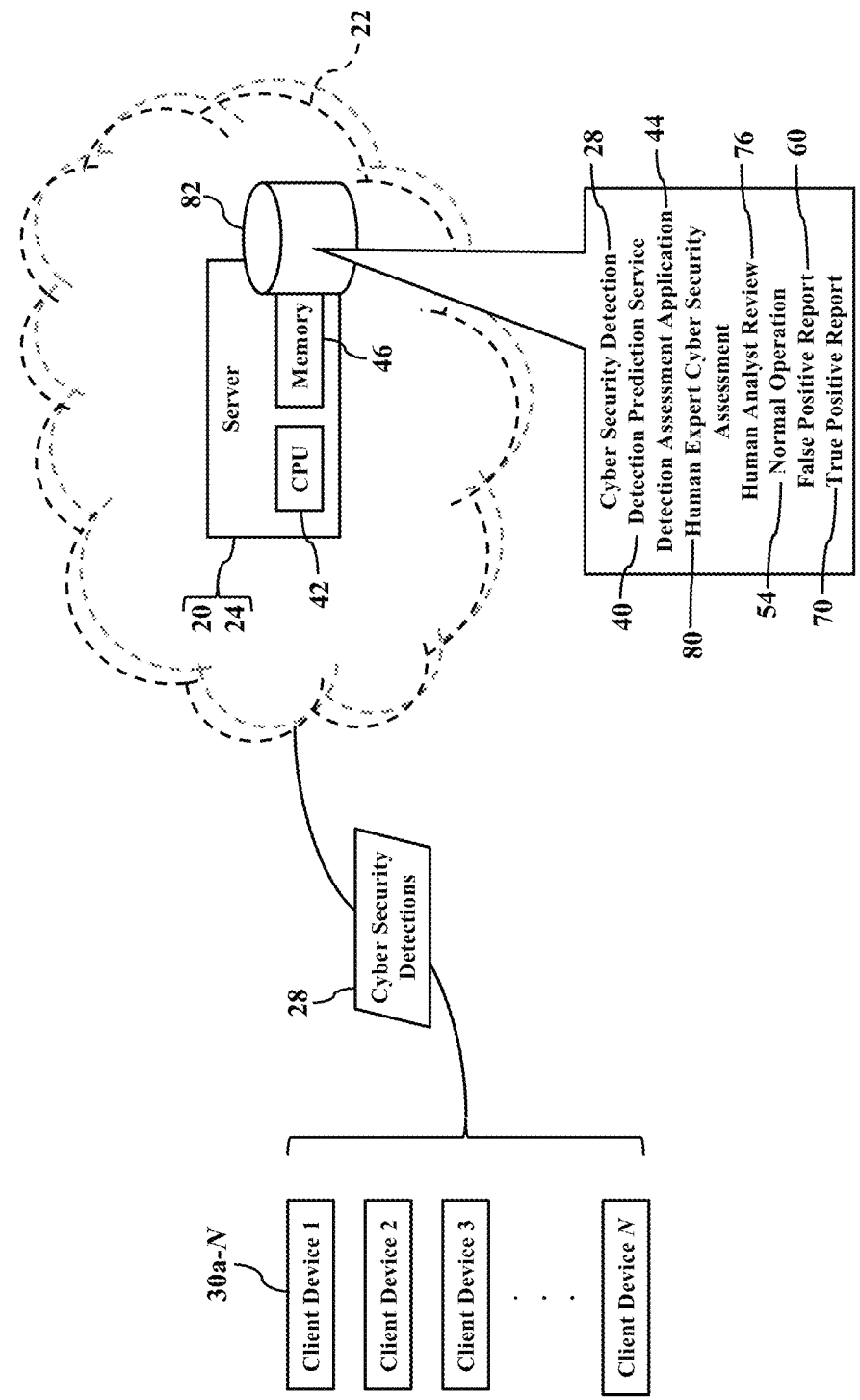
FIGS. 5-6 illustrate examples of historical malware expertise.
Figure 6:
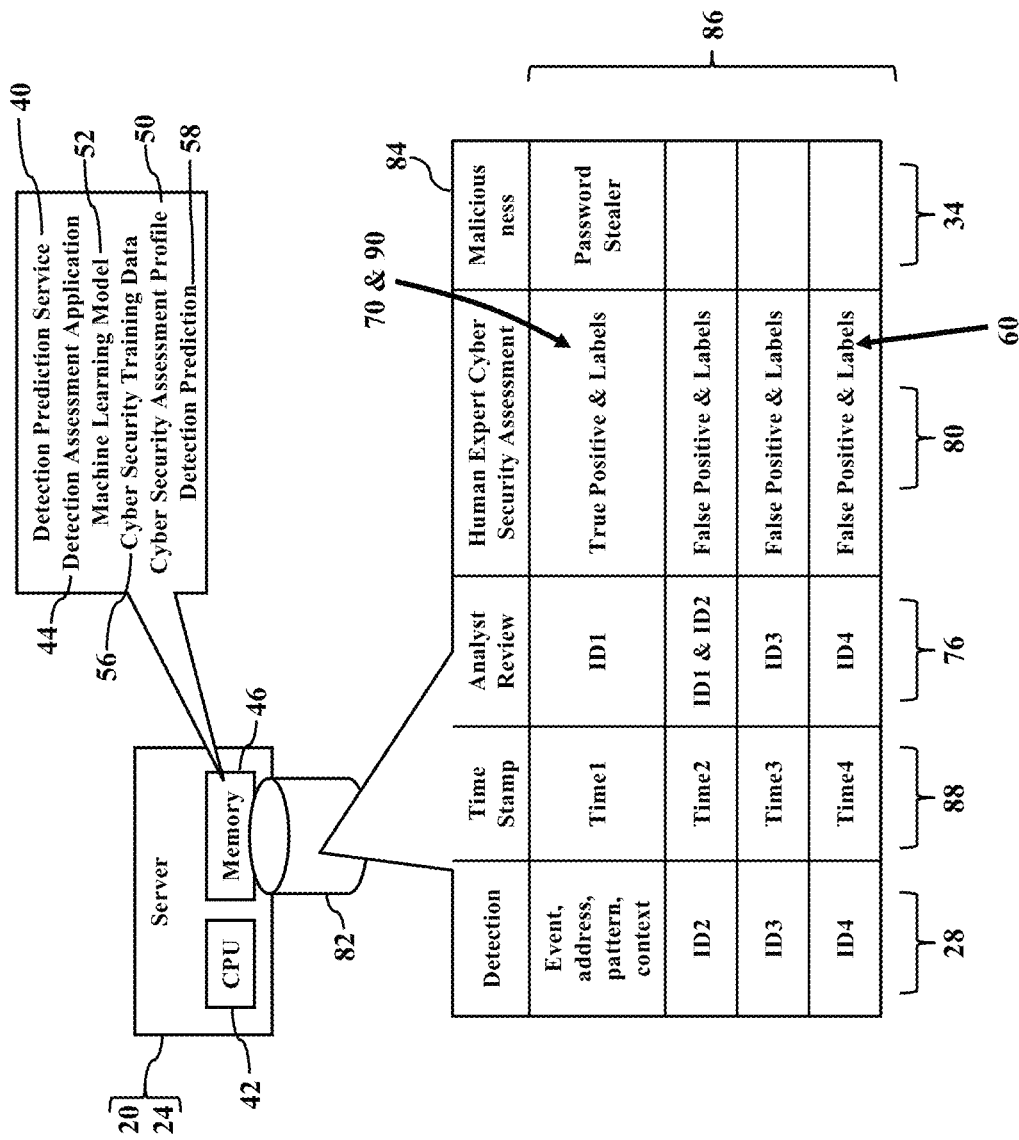

FIGS. 5-6 illustrate examples of historical cyber security expertise. As this disclosure above explained, every week the cloud-computing environment 22 may receive thousands of the cyber security detections 28. The cyber security detections 28 are sent by the client devices 30. While this disclosure only illustrates a few client devices 30, in actual practice there may be millions of client devices 30 reporting thousands of cyber security detections 28 each week. Each cyber security detection 28 may then be scrutinized by human cyber security expert analysts. These human cyber security expert analysts work 24/7/365 to manually review the cyber security detections 28. These human cyber security expert analysts ensure that no malicious detections are missed. The human cyber security expert analysts are specially-trained, subject matter experts in detecting the maliciousness 34. Over time, then, the human cyber security expert analysts have precisely labeled and classified millions of the cyber security detections 28. The cloud-based cyber security detection prediction service 40 thus leverages this rich and extensive cyber security knowledge developed by the best cyber security threat hunters.

The cyber security detection prediction service 40 may thus retain records of these human expert cyber security assessments 80. As the human cyber security expert analysts scrutinize the thousands of weekly cyber security detections 28, the cloud-based cyber security detection prediction service 40 comprehensively stores and logs the details of each human expert cyber security assessment 80 conducted by the human cyber security expert analysts. The cloud-based cyber security detection prediction service 40 may thus retain vast amounts of institutional cyber security knowledge developed over months/years by the subject matter experts in detecting the maliciousness 34. While any architecture or component may represent this historical cyber security expertise, FIGS. 5-6 illustrate an electronic database 82 of cyber security detections. The electronic database 82 of cyber security detections stores an electronic record of each cyber security detection 28 and the corresponding human expert cyber security assessment 80 conducted by the human cyber security expert analyst(s).

The cyber security detection prediction service 40 thus maintains a rich repository of historical cyber security knowledge. As the cloud-computing environment 22 receives and assesses the cyber security detections 28, the cloud-computing environment 22 may collect and store the cyber security detections 28 to the electronic database 82 of cyber security detections. While the electronic database 82 may be remotely stored and accessed/queried from any networked location, for simplicity FIG. 5 illustrates the electronic database 82 as being locally stored in the memory device 46 of the server 24. Even though the electronic database 82 may have any logical structure, a relational database is perhaps easiest to understand. FIG. 6 thus illustrates the electronic database 82 as a table 84 having row and columnar database entries that map, relate, convert, or associate different cyber security detections 28 to their corresponding electronic data 86 and to their corresponding human expert cyber security assessment 80. As the many cyber security detections 28 are routed to the server 24, the detection assessment application 44 may add database entries that log each cyber security detection 28, its corresponding date/time stamp 88, and its corresponding electronic data 86 (such as process event, communication address, activity, behavior, data value, bit pattern, and/or contextual login/location). Moreover, if the cyber security detection 28 was scrutinized during the human analyst review 76, the electronic database 82 may further log and identify the names/identifiers of the human expert analyst(s) and his/her/their human expert cyber security assessment 80. The human expert cyber security assessment 80 may thus also include any classification or label(s) 90 applied by the human cyber security expert analyst(s), such as whether the cyber security detection 28 was finally assessed to be the maliciousness 34. The human expert cyber security assessment 80 may also include notes or analysis used/applied by the human cyber security expert analyst(s) to assess the cyber security detection 28. So, when the cloud-based cyber security detection prediction service 40 receives and evaluates any new or current cyber security detection 28, the cloud-based cyber security detection prediction service 40 may query the electronic database 82 of cyber security detections and identify and/or retrieve any historically-assessed cyber security detection 28 that was previously logged. If a matching database entry is determined, then the detection assessment application 44 may identify and/or retrieve any corresponding columnar/row entries.

The cloud-based cyber security detection prediction service 40 thus leverages this rich and extensive malware knowledge developed by the best cyber security threat hunters. The electronic database 82 of cyber security detections may be tapped to train the machine learning model 52. The detection assessment application 44, for example, may retrieve any of the database entries (e.g., the cyber security detection 28, the date/time stamp 88, the electronic data 86, the human expert analyst(s), the human expert cyber security assessment 80, the classification or label(s) 90, and notes or analysis). The detection assessment application 44 may then use the database entries as the cyber security training data 56 to the machine learning model 52. The machine learning model 52 may thus generate the cyber security assessment profile 50 that statistically describes the safe or normal operation 54 (and/or the outlier or anomaly detection 72), as derived from the cyber security expert analysts. Indeed, the database entries associated with the human expert cyber security assessments 80 may be exclusively or solely used to train the machine learning model 52, thus generating the cyber security assessment profile 50 to reflect only the human expert cyber security assessments 80 performed or conducted by the human cyber security analyst experts. So, when the detection assessment application 44 inspects the cyber security detection 28, the machine learning model 52 generates the detection prediction 58 that far more precisely distinguishes the false positive reports 60 from the true positive reports 70, based on the deep-dive analyses that only the human cyber security expert analyst(s) can provide. The machine learning model 52 thus accurately predicts whether a detection or activity is malicious or not, but the machine learning model 52 may additionally predict what the required actions could be on the detection. The cloud-based cyber security detection prediction service 40 may thus automates the processing and handling of the cyber security detections 28 and also reveals and highlights important detections related to particular threat actors. The cloud-based cyber security detection prediction service 40 reflects vast amounts of institutional cyber security knowledge developed by the human cyber security expert analysts in detecting the maliciousness 34.

The cloud-based cyber security detection prediction service 40 is highly accurate. The cloud-based cyber security detection prediction service 40 generates the detection prediction 58 as the false positive report 60 or as the true positive report 70. The detection prediction 58 is based on deep level machine analysis of thousands of similar detections and the historical human expert cyber security assessments 80 made by subject matter experts in detecting the maliciousness 34. The human cyber security expert analysts are available around the clock to assess any cyber security detection 28 and to remediate as required. However, to ensure that no maliciousness goes undetected, the cyber security detections 28 often report innocuous activity. As a result, a significant part of the cloud-based cyber security detection prediction service 40 is dealing with incorrect detections quickly and accurately. The cloud-based cyber security detection prediction service 40 may thus capture and retain the human expert cyber security assessments 80 made by the human cyber security expert analysts. Over time, then, millions of cyber security detections 28 are assessed by the human cyber security expert analysts. These human expert cyber security assessments 80 represent a vast institutional knowledge of detecting and stopping cyber security attacks. As a result, cloud-based cyber security detection prediction service 40 sits on top of an incredibly large set of accurately labeled, expertly-analyzed detection data from real-world detections within well maintained customer and client environments.

The cloud-based cyber security detection prediction service 40 leverages machine learning and the human expert cyber security assessments 80. The cloud-based cyber security detection prediction service 40 pulls any or all data details for a detection reported by the cyber security detection 28. The cloud-based cyber security detection prediction service 40 compares the detailed data 86 (associated with the cyber security detection 28) to the cyber security assessment profile 50 generated by the machine learning model 52. The cloud-based cyber security detection prediction service 40 generates the detection prediction 58, based on historical observations or historical artifacts that relate to whether the cyber security detection 28 is the True positive report 70 or the False positive report 60 with a high level of confidence.

The cloud-based cyber security detection prediction service 40 provides many improvements to computer functioning. The cyber security assessment profile 50, for example, is autonomously and automatically generated by the machine learning model 52. Conventional malware detection solutions use manually-generated profiles that are exceptionally laborious to create and slow to implement. Manually-generated profiles, in plain words, are simply too complicated to humanly complete, as hundreds or even thousands of rules must be coded. In practice, then, manually-generated profiles are too simple and incomplete, thus causing conventional malware detection products to under catch, or over catch, the maliciousness 34. Moreover, conventional detection schemes train machine learning models with threat data. That is, conventional schemes train machine learning models to identity or predict malware using known, previously discovered vulnerability traits. These conventional schemes, in other words, fail to detect new or unknown vulnerabilities that can wreak havoc on the client devices 30. The conventional schemes must also repeatedly retrain the machine learning models to recognize the latest-discovered threat. The cloud-based cyber security detection prediction service 40, in contradistinction, trains the machine learning model 52 with the human expert cyber security assessments 80 determined by the human cyber security analyst experts. These historical human expert cyber security assessments 80 are much more accurate and nuanced in describing and differentiating the false positive reports 60 from the true positive reports 70. Because the server 24 implements the machine leaning model 52 trained using the historical human expert cyber security assessments 80 determined by the human cyber security analyst experts, the server 24 more accurately recognizes the false positive reports 60 and the true positive reports 70 in much less time.

Figure 7:
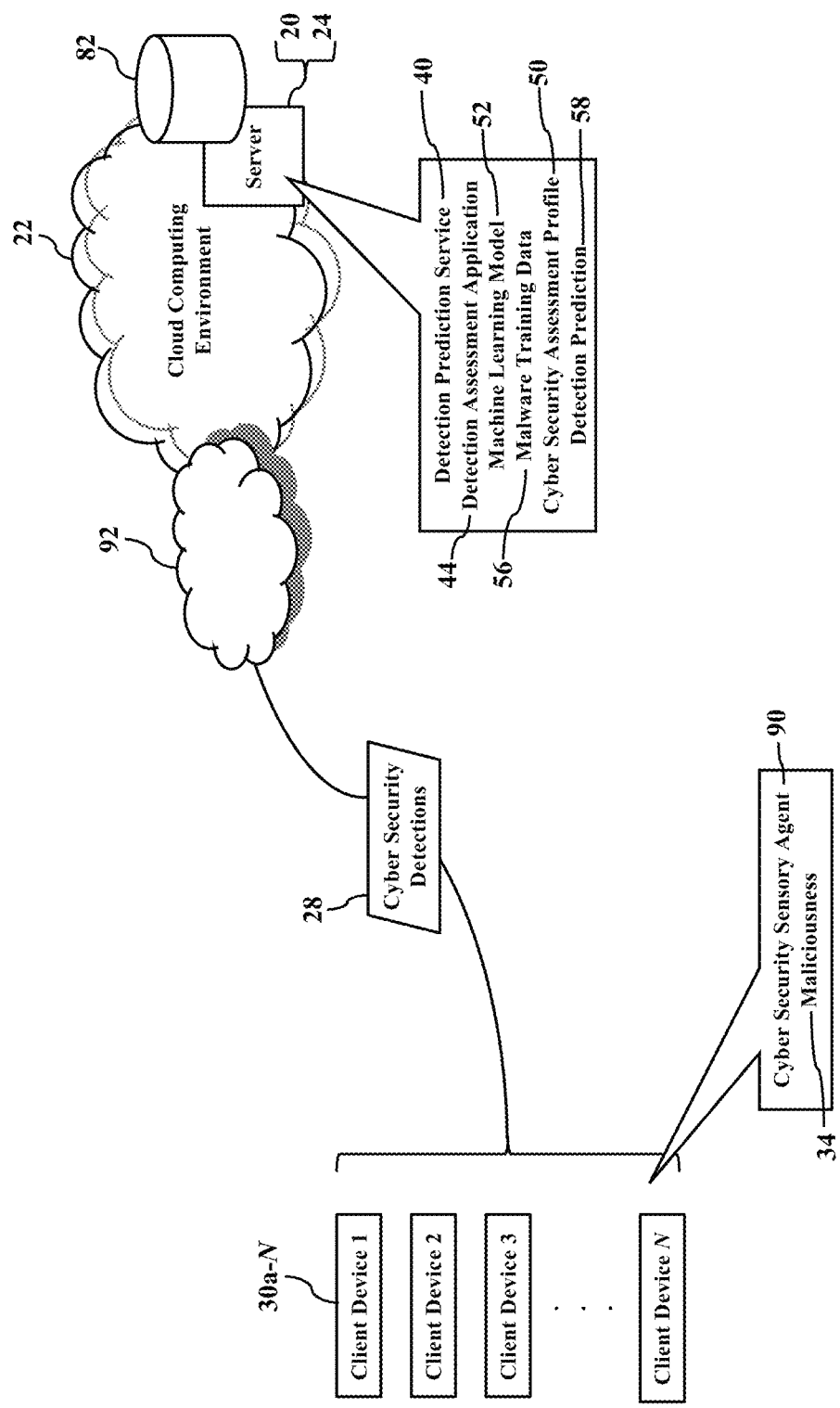
FIG. 7 illustrates detailed examples of cyber security detections.

FIG. 7 illustrates more detailed examples of the cyber security detections 28. While the detection assessment application 44 may monitor any desired data, in these examples the detection assessment application 44 monitors the cyber security detections 28 reported by the client devices 30. Again, for simplicity, FIG. 7 only illustrates several client devices 30*a*-N. In actual practice, though, there may be thousands, or even millions, of the client devices 30 operating throughout the world. Each client device 30 downloads, stores, and executes a cyber security sensory agent 90. The cyber security sensory agent 90 is installed on the corresponding client device 30. The cyber security sensory agent 90 thus includes computer program, code, or instructions that scan and monitor its corresponding client device 30 for events, communications, processes, activities, behaviors, data values, usernames/logins, locations, contexts, and/or patterns that indicate evidence of the maliciousness 34. Should any cyber security sensory agent 90 detect evidence of the maliciousness 34 at the corresponding client device 30, the cyber security sensory agent 90 instructs its client device 30 to generate and to report the cyber security detection 28 to the cloud-computing environment 22. The cyber security detection 28 is routed via access/communications networks 92 to a network address (e.g., IP address) associated with the cloud-computing environment 22. The cloud-computing environment 22 may then route the cyber security detection 28 to the network address (e.g., IP address) associated with the server 24 hosting or providing the cyber security detection prediction service 40. The server 24 logs each cyber security detection 28 in the electronic database 82 of cyber security detections. The cyber security detection 28 may include a detailed description of the client device 30 (e.g., make, model, software and hardware inventory) and the events, communications, activities, behaviors, data values, and/or patterns that triggered reporting. The server 24 executes the detection assessment application 44 and compares the cyber security detection 28 to the cyber security assessment profile 50 generated by the machine learning model 52 (as this disclosure explains).

The cyber security sensory agent 90 may monitor identity domains and sensory agent domains. The cyber security sensory agent 90 monitors endpoint processes conducted by the client device 30. The client device 30, in simple words, may be performing/executing an unusual/suspicious process or attempting an unusual/suspicious event, communication, activity, behavior, command line, or data value. The cyber security sensory agent 90, however, may also monitor identity and contextual indicators, such as login attempts (usernames, passwords, dates/times), webpage domains/requests, locations, IP addresses, and usage of software applications. The cyber security sensory agent 90 may monitor and report any unusual or suspicious usage context for the cyber security detection prediction service 40. The cyber security detection 28 may thus include a contextual detection that describes any current, unusual, or suspicious identity or context. When the server 24 receives the cyber security detection 28, the server 24 logs and stores the cyber security detection 28 to the electronic database 82 of cyber security detections. The detection assessment application 44, in particular, may instruct the server 24 to add database entries that log the contextual detection in association with the corresponding columnar/row entries. The human expert cyber security assessments 80 may thus include contextual usage/identity/location as determined by the human cyber security analyst experts.

Computer functioning is improved. The detection assessment application 44 caues the server 24 to monitor both the identity domains and sensory agent domains. The detection assessment application 44 may thus correlate data points across disparate streams and across a period of time. The detection assessment application 44 may correlate identity based detections with related sensory agent based detections, and look for patterns that can be used to improve operation efficiency across the two domains. The detection assessment application 44 thus more quickly and efficiently detects the maliciousness 34.

The cyber security sensory agent 90 monitors the client device 30. The cyber security sensory agent 90 interfaces with an operating system executed by the client device 30. The cyber security sensory agent 90 is a software application or program code stored in a memory device of the client device 30 and executed by a hardware processor operating within the client device 30. The cyber security sensory agent 90 may thus have permissions to monitor any kernel-level activity and/or any user-mode activity conducted by the client device 30 (such as any smartphone, laptop, tablet, server, switch, or other computer). Should the cyber security sensory agent 90 detect any suspicious activity, the cyber security sensory agent 90 cooperates with the operating system to generate and send the cyber security detection 28 to the cloud-computing environment 22.

Computer functioning is further improved. Each week the server 24 may receive thousands of cyber security detections 28 reported by the millions of the malware sensory agents 90. The server 24 must very quickly assess each cyber security detection 28 to prevent the maliciousness 34 from damaging the client devices 30. The server 24 must further quickly assess each cyber security detection 28 to stop the maliciousness 34 from spreading and infecting other machines. However, because the server 24 executes the detection assessment application 44 providing the machine-learned cyber security detection prediction service 40, the server 40 need only compare the cyber security detection 28 to the cyber security assessment profile 50 using logical statements. The logical statements are quick and easy to execute (requiring reduced hardware resources and electrical power). The server 24 requires less time and resources to detect the maliciousness 34.

Figure 8:
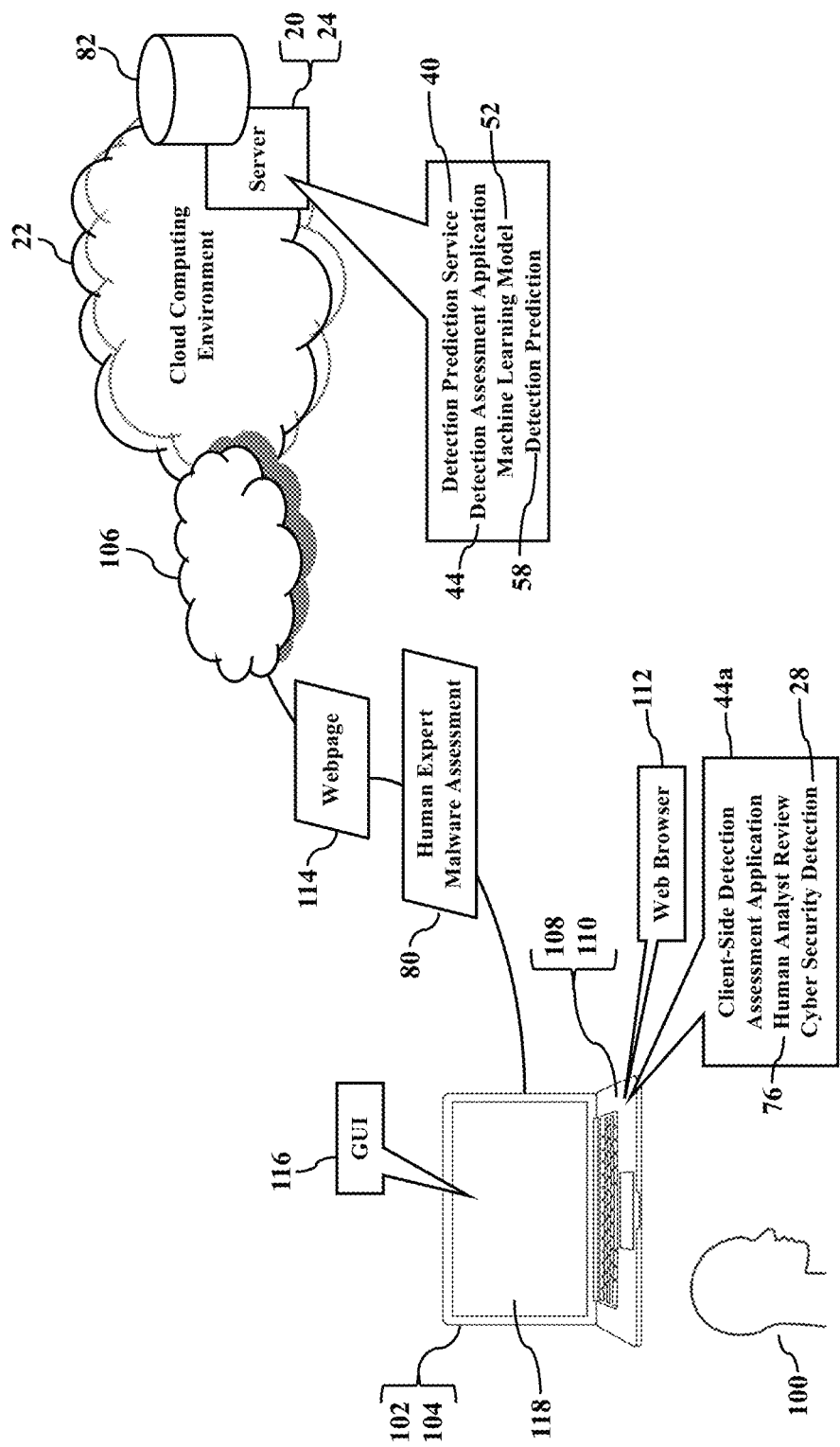
FIG. 8 illustrates examples of remote access.

FIG. 8 illustrates examples of remote access. When a user (such as the human cyber security analyst expert 100) scrutinizes the cyber security detection 28 and performs the human analyst review 76, the analyst's computer 102 may interface with the server 24. FIG. 8 illustrates the analyst's computer 102 as a remote laptop computer 104, but the analyst's computer 102 may be any smartphone, tablet, server, or other computer. The analyst's computer 102 has a network interface to an access network or other communications network 106, thus allowing the analyst's computer 102 to establish network communications with the cloud-computing environment 22 and/or with the server 24. The analyst's computer 102 may thus have access permissions to the cloud-computing environment 22 and/or to the server 24. The analyst's computer 102 has a hardware processor 108 that executes a client-side version 44a of the detection assessment application stored in a memory device 110. The detection assessment application 44 and the client-side version 44a may cooperate in a client-server relationship to facilitate the human analyst review 76 of the cyber security detection 28.

While any mechanism may be used, FIG. 8 illustrates examples using web pages. The analyst's computer 102 stores and executes a web browser 112 that interfaces with the client-side version 44a of the detection assessment application. When the human cyber security analyst expert 100 conducts the human analyst review 76, the user commands the client-side version 44a of the detection assessment application to establish communication with the server 24 and to access the electronic database 82 logging the cyber security detection 28. The web browser 112 and the client-side version 44a cooperate to request and to receive a webpage 114 having content representing the cyber security detection 28 retrieved from the electronic database 82. The analyst's computer 102 processes and displays the webpage 114 as a graphical user interface (GUI) 116 via a display device 118. The human cyber security analyst expert 100 may thus scrutinize the cyber security detection 28 and type or enter the human expert cyber security assessment 80. The web browser 112 and the client-side version 44a cooperate to send the human expert cyber security assessment 80 via the communications network 106 and the cloud-computing environment 22 to the server 24. When the server 24 receives the human expert cyber security assessment 80, the detection assessment application 44 adds a database entry to the electronic database 82 that associates the human expert cyber security assessment 80 to the cyber security detection 28. The human expert cyber security assessment 80 may thus be used to train the machine learning model 52.

The machine-learned cyber security detection prediction service 40 may thus rely on the human cyber security analyst experts 100. While the detection assessment application 44 may autonomously and automatically generate the detection prediction 58 (using the machine learning model 52), the cyber security detection prediction service 40 is improved by training using the human expert cyber security assessments 80. While some analysts may merely rely on the detection prediction 58 as a fast-track determination and response, ongoing involvement of the human cyber security analyst experts 100 continuously improves the strength of the detection prediction 58. As the maliciousness 34 (illustrated in FIG. 7) continuously evolves and obfuscates, the guidance, training, and experience provided by the human cyber security analyst experts 100 curates the dataset from which the detection prediction 58 is developed.

Figure 9:
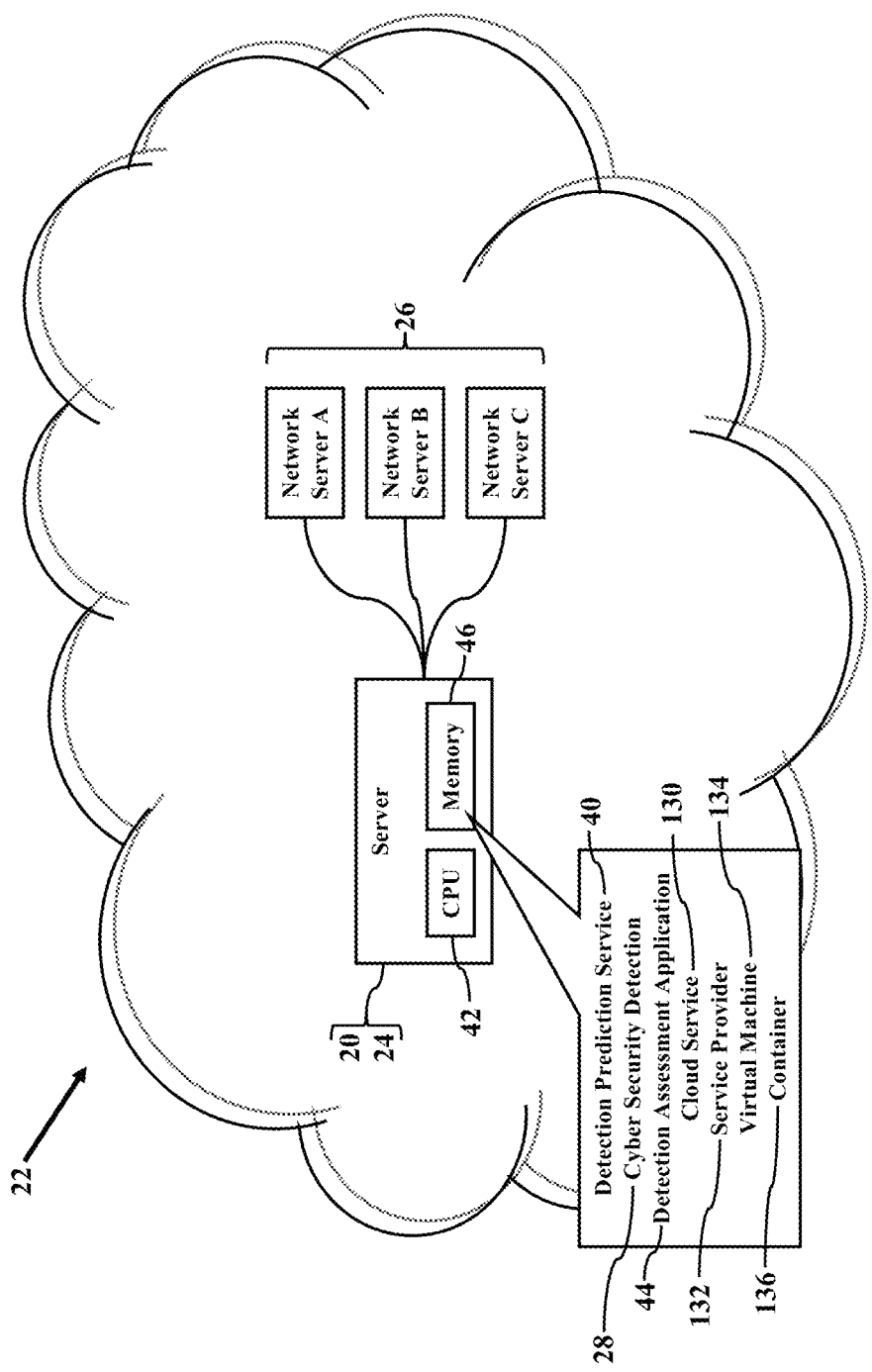
FIG. 9 illustrates examples of containerized malware assessment services.

FIG. 9 illustrates examples of containerized architectures. FIG. 9 again illustrates the server 24 communicating with the other servers, devices, computers, or other network members 26 operating within, or affiliated with, the cloud-computing environment 22 (e.g., public Internet, private network, and/or hybrid network). The server 24 is programmed to provide the cyber security detection prediction service 40 as one or more cloud services 130 associated with the cloud-computing environment 22. The detection assessment application 44 may thus instruct or cause the server 24 to provide the cloud service 130, perhaps on demand, on behalf of a service provider 132. The detection assessment application 44 may be executed by, or associated with, a virtual machine 134. The detection assessment application 44, in particular, may be packaged as an isolated container 136 that contains all of the necessary elements to provide the cloud service 130. The detection assessment application 44, for simplicity, is thus known as a containerized service 136 and 130. The cloud-computing environment 22 delivers hosted cloud-native services, like storage, servers, and application services (such as the cyber security detection prediction service 40), via the cloud-computing environment 22. Various implementations of the cloud-computing environment 22 are possible and could be used in the examples herein described. When the server 24 receives the cyber security detection 28, the detection assessment application 44 instructs the server 24 to provide the malware containerized service 136 and 130 and assess the cyber security detection 28, as this disclosure above explains.

The detection prediction 58 speeds human review. The human expert cyber security assessments 80 provide a thorough cyber security assessment of the cyber security detection 28 and its detailed data 86. Because the machine learning model (illustrated as reference numeral 52 in FIGS. 2-8) is trained using the human expert cyber security assessments 80, the cyber security detection prediction service 40 (illustrated in FIGS. 2-8) generates better predictive decisions about what customer detections are true positive reports 70 and false positive reports 60 (illustrated in FIGS. 2-7). As the human cyber security analyst expert 100 performs the human analyst review 76 and scrutinizes the cyber security detection 28, the web browser 112 and the client-side version 44a may cooperate to send and display the detection prediction 58 via the graphical user interface (GUI) 116 (all illustrated in FIG. 8). So, as the human cyber security analyst expert 100 performs the human analyst review 76, the human cyber security analyst expert 100 may also consider the detection prediction 58. The detection prediction 58 may aid in diagnosing a customer detection. Moreover, the detection assessment application 44 may further provide a list of any classification 90 that the machine learning model 52 disagrees with the most in order to seed an escalation for more investigation. The cloud-based cyber security detection prediction service 40 thus reveals what aspects of an incoming detection make it a likely false positive report 60 or a true positive report 70.

Machine learning is improved. The machine learning model 52 is trained using the human expert cyber security assessments 80 associated with the cyber security detections 28 (illustrated in FIG. 8). Each human expert cyber security assessment 80 may thus include or reference the detailed data 86 associated with the corresponding cyber security detection 28. While the detailed data 86 may include hundreds or even thousands of parameters, current testing reveals that only some features need be extracted. For example, the detection assessment application 44 may extract a best feature set that includes features from a couple of categories: direct, behavior categories and hash features. The direct features are a severity and confidence fields directly from the documentation describing the cyber security detection 28. The behavior categories are, for example, behavior_id, pattern_disposition, template_instance_id, and user_type fields from each of first ten (10) behaviors. Most detections only have one or two behaviors, but the cloud-based cyber security detection prediction service 40 may capture any information from large detections. The hash features may include information from VIRUSTOTAL® about the hashes involved in each behavior. The feature vector length is currently 138. The features may further include information from the command line already available in the data 86 and from outside, data sources (such as CROWDSTRIKE THREAT GRAPH® and CROWD-STRIKE CROWDSCORE®) that add more context.

The machine learning model 52 is trained using the extracted features. During experimental testing, the machine learning model 52 was trained using the XGBOOST® library. Categorical features were used to better reflect what the incoming data is and to improve performance. The machine learning model 52 may be preferably kept lighter so that retraining may be performed multiple times per day as it learns from analysts' decisions in real time. The detection assessment application 44 may utilize application programming interfaces to interact with the machine learning model 52. Moreover, the detection assessment application 44 may further generate and provide the machine learning model's top disagreements with analysts' decisions.

Experimental testing was performed. First experiments were conducted using the cyber security training data 56 of 120,600 1 (true positive) labels and 158,481 0 (false positive) labels (illustrated as reference numeral 90 in FIG. 6). Subsequent validation data included 504,94 1 (true positive) labels and 664,71 0 (false positive) labels. The experiments were conducted locally with PYTHON® 3.9 (XGBOOST® 1.6.1). Second experiments were conducted using months of the detailed data 86 associated with the cyber security detections 28. Models are searched with grid search and trained with cross-validation. Best setup is trained again on the entire data to obtain the delivered model 52. For comparing different experiments, the parameters from the best model are used again to train a model with 9-fold cross validation. Experiments are done on AWS® with PYTHON® 3.6.9 (XGBOOST® 1.5.2).

Figure 10:
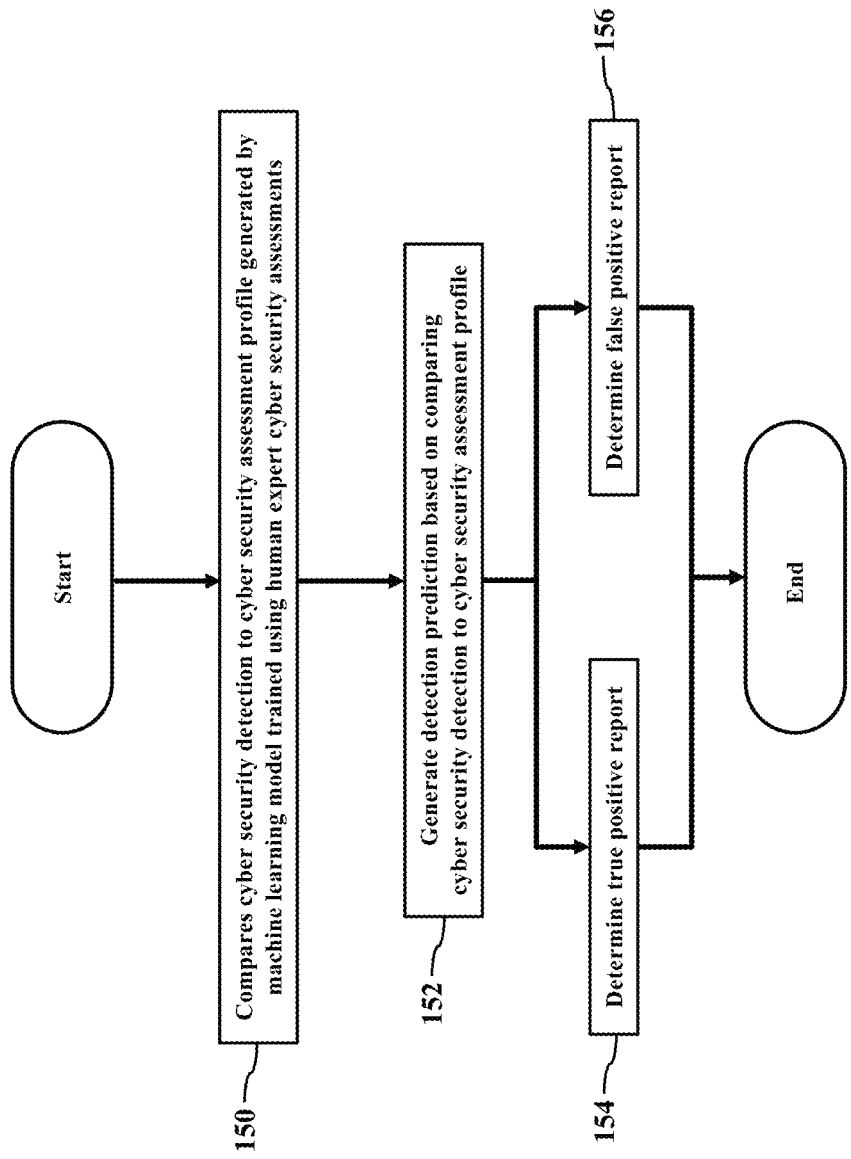
FIGS. 10-11 illustrate examples of methods or operations that assess and resolve the cyber security detections.

FIG. 10 illustrates examples of a method or operations executed by the computer 20 that assess and resolve the cyber security detection 28. The computer 20 compares the cyber security detection 28 to the cyber security assessment profile 50 generated by the machine learning model 52 trained using the human expert cyber security assessments 80 (Block 150). The computer 20 generates the detection prediction 58 based on the comparing of the cyber security detection 28 to the cyber security assessment profile 50 (Block 152). The computer 20 may determine the detection prediction 58 to be the true positive report 70 (Block 154) or the false positive report 60 (Block 156).

Figure 11:
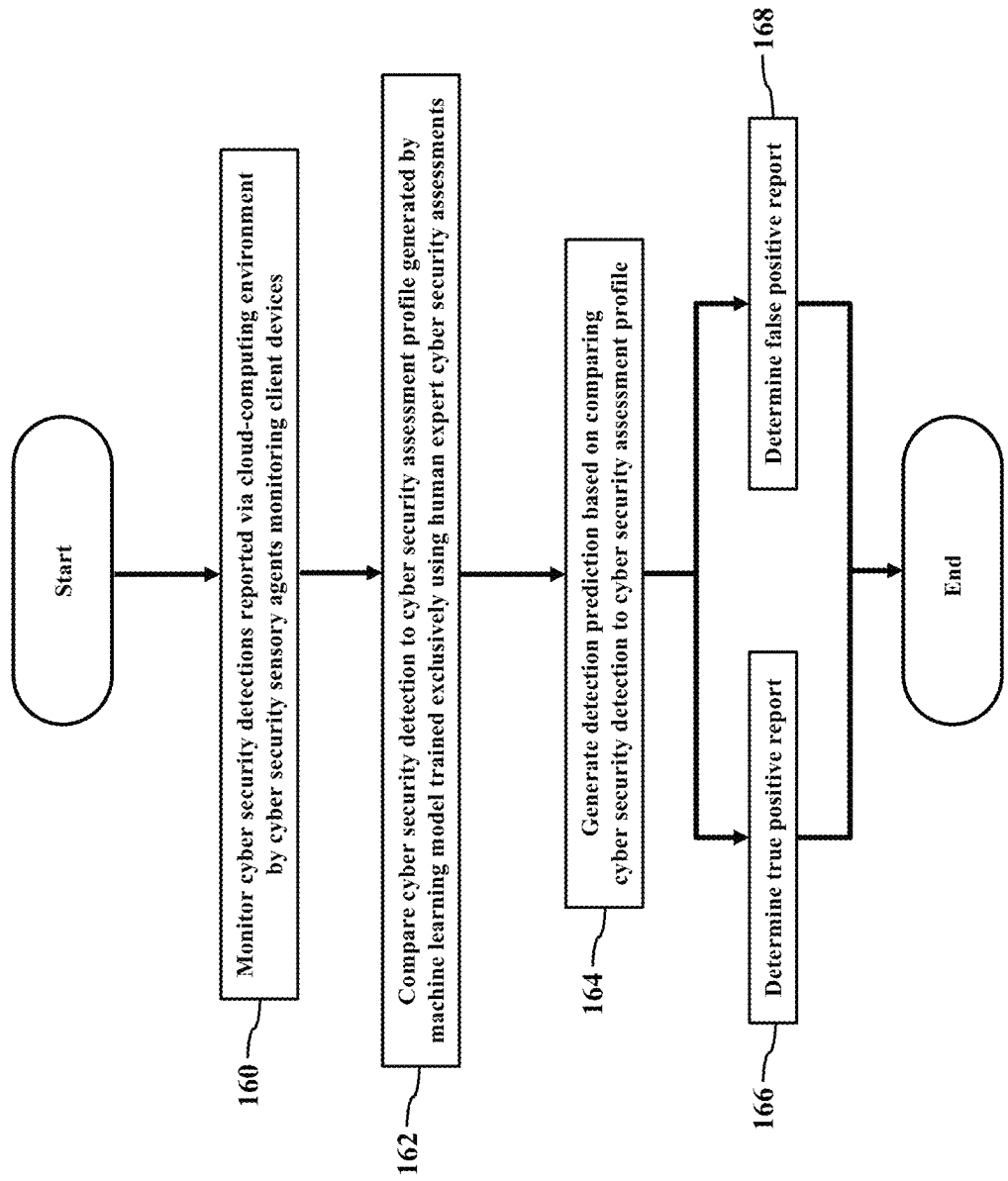

FIG. 11 illustrates examples of another method or operations executed by the computer 20 that assess and resolve the cyber security detection 28. The computer 20 monitors the cyber security detections 28 reported via the cloud-computing environment 22 by the cyber security sensory agents 90 monitoring the client devices 30 for the maliciousness 34 (Block 160). The computer 20 compares the cyber security detections 28 to the cyber security assessment profile 50 generated by the machine learning model 52 trained exclusively using the human expert cyber security assessments 80 (Block 162). The computer 20 generates the malware predictions 58 based on the comparing of the cyber security detections 28 to the cyber security assessment profile 50 (Block 164). The computer 20 may determine the detection prediction 58 to be the true positive report 70 (Block 166) or the false positive report 60 (Block 168).

Figure 12:
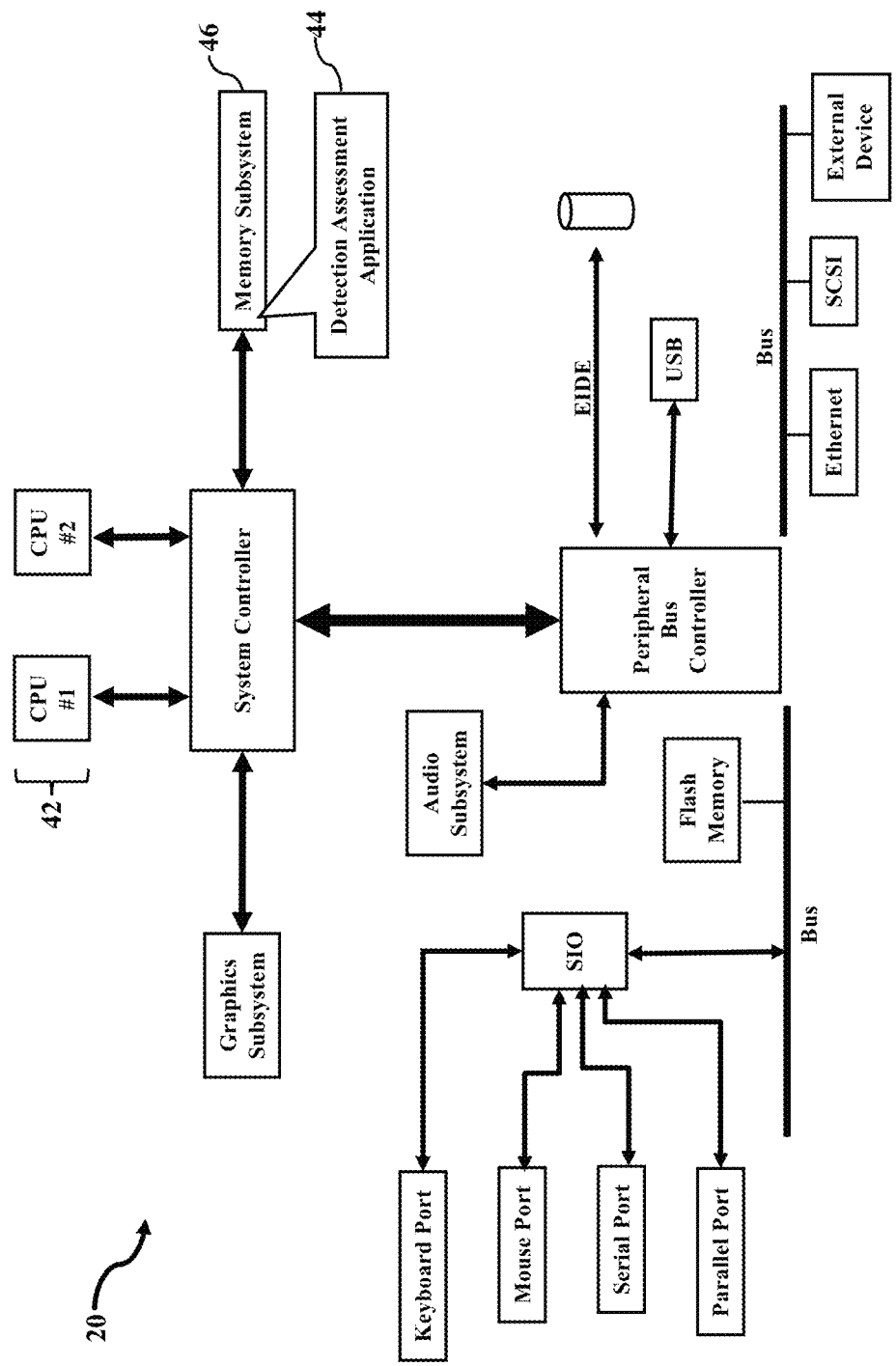
FIG. 12 illustrates a more detailed example of an operating environment.

FIG. 12 illustrates a more detailed example of the operating environment. FIG. 12 is a more detailed block diagram illustrating the computer 20 (and thus the server 24 and the network member 26). The detection assessment application 44 is stored in the memory subsystem or device 46. One or more of the hardware processors 42 communicate with the memory subsystem or device 46 and execute the detection assessment application 44. Examples of the memory subsystem or device 46 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer 20 is known to those of ordinary skill in the art, no detailed explanation is needed.

The computer 20 may have any embodiment. This disclosure mostly discusses the computer 20 as the server 24. The cloud-based cyber security detection prediction service 40, however, may be easily adapted to mobile computing, wherein the computer 20 may be a smartphone, a laptop computer, a tablet computer, or a smartwatch. The cloud-based cyber security detection prediction service 40 may also be easily adapted to other embodiments of smart devices, such as a television, an audio device, a remote control, and a recorder. The cloud-based cyber security detection prediction service 40 may also be easily adapted to still more smart appliances, such as washers, dryers, and refrigerators. Indeed, as cars, trucks, and other vehicles grow in electronic usage and in processing power, the cloud-based cyber security detection prediction service 40 may be easily incorporated into any vehicular controller.

The above examples of the cloud-based cyber security detection prediction service 40 may be applied regardless of the networking environment. The cloud-based cyber security detection prediction service 40 may be easily adapted to stationary or mobile devices having wide-area networking (e.g., 4G/LTE/5G cellular), wireless local area networking (WI-FI®), near field, and/or BLUETOOTH® capability. The cloud-based cyber security detection prediction service 40 may be applied to stationary or mobile devices utilizing any portion of the electromagnetic spectrum and any signaling standard (such as the IEEE 802 family of standards, GSM/CDMA/TDMA or any cellular standard, and/or the ISM band). The cloud-based cyber security detection prediction service 40, however, may be applied to any processor-controlled device operating in the radio-frequency domain and/or the Internet Protocol (IP) domain. The cloud-based cyber security detection prediction service 40 may be applied to any processor-controlled device utilizing a distributed computing network, such as the Internet (sometimes alternatively known as the "World Wide Web"), an intranet, a local-area network (LAN), and/or a wide-area network (WAN). The cloud-based cyber security detection prediction service 40 may be applied to any processor-controlled device utilizing power line technologies, in which signals are communicated via electrical wiring. Indeed, the many examples may be applied regardless of physical componentry, physical configuration, or communications standard(s).

The computer 20 and the network members 26 may utilize any processing component, configuration, or system. For example, the cloud-based cyber security detection prediction service 40 may be easily adapted to any desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or any other manufacturer. The computer 20 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The cloud-based cyber security detection prediction service 40 may use packetized communications. When the computer 20, the server 24, or any network member 26 communicates via the cloud-computing environment 22, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The cloud-computing environment 22 may utilize any signaling standard. The cloud-computing environment 22 may mostly use wired networks to interconnect the network members 26. However, the cloud-based cyber security detection prediction service 40 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud-based cyber security detection prediction service 40 may also utilize other standards, such as the I.E.E.E. 802 family of standards, the Industrial, Scientific, and Medical band of the electromagnetic spectrum, BLUETOOTH®, low-power or near-field, and any other standard or value.

The cloud-based cyber security detection prediction service 40 may be physically embodied on or in a computer-readable storage medium. This computer-readable medium, for example, may include CD-ROM, DVD, tape, cassette, floppy disk, optical disk, USB flash memory drive, memory card, memory drive, and large-capacity disks. This computer-readable medium, or media, could be distributed to end-subscribers, licensees, and assignees. A computer program product comprises processor-executable instructions for providing the cloud-based cyber security detection prediction service 40, as the above paragraphs explain.

The diagrams, schematics, illustrations, and the like represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer that assesses a cyber security detection, comprising:
   pre-screening the cyber security detection by routing, by the computer, the cyber security detection to a cyber security detection prediction service that compares the cyber security detection to a cyber security assessment profile generated by a machine learning model trained using historical process events humanly labeled as normal operations determined by human expert cyber security assessment;
   receiving, by the computer, a detection prediction output by the cyber security detection prediction service that predicts the cyber security detection as a true positive report based on a statistical conformance of the cyber security detection to the cyber security assessment profile; and in response to the detection prediction of the true positive report, queuing, by the computer, the cyber security detection for the human expert cyber security assessment.

2. The method of claim 1, further comprising determining a false positive report associated with the cyber security detection.

3. The method of claim 1, further comprising extracting labels associated with the historical process events humanly labeled as the normal operations.

4. The method of claim 1, further comprising determining that the cyber security detection conforms to the cyber security assessment profile generated by the machine learning model.

5. The method of claim 1, further comprising determining that the cyber security detection fails to conform to the cyber security assessment profile generated by the machine learning model.

6. The method of claim 1, further comprising classifying the cyber security detection.

7. The method of claim 1, further comprising extracting behavioral features from the human expert cyber security assessments.

8. The method of claim 1, further comprising extracting hash features from the human expert cyber security assessments.

9. The method of claim 1, further comprising extracting command line features from the human expert cyber security assessments.

10. A computer that assesses a cyber security detection, comprising:
a central processing unit; and
a memory device storing instructions that, when executed by the central processing unit, perform operations, the operations comprising:
receiving the cyber security detection reported via a cloud-computing environment by a cyber security sensory agent;
pre-screening the cyber security detection by routing the cyber security detection via the cloud-computing environment to a cyber security detection prediction service;
comparing the cyber security detection to a cyber security assessment profile associated with the cyber security detection prediction service, the cyber security assessment profile generated by a machine learning model trained using historical process events humanly labeled as normal operations determined by human expert cyber security assessment;
determining a statistical conformance of the cyber security detection to the cyber security assessment profile generated by the machine learning model;
receiving a detection prediction as an output generated by the cyber security detection prediction service that predicts the cyber security detection as a true positive report or as a false positive report; and
in response to the detection prediction of the true positive report, queuing the cyber security detection for the human expert cyber security assessment.

11. The computer of claim 10, wherein the operations further comprise predicting the false positive report associated with the cyber security detection.

12. The computer of claim 10, wherein the operations further comprise predicting the true positive report associated with the cyber security detection.

13. The computer of claim 10, wherein the operations further comprise determining that the cyber security detection conforms to the cyber security assessment profile.

14. The computer of claim 10, wherein the operations further comprise determining that the cyber security detection fails to conform to the cyber security assessment profile.

15. The computer of claim 10, wherein the operations further comprise extracting cyber security classification labels from the human expert cyber security assessments.

16. The computer of claim 15, wherein the operations further comprise training the machine learning model using the cyber security classification labels extracted from the human expert cyber security assessments.

17. A memory device storing instructions that, when executed by a central processing unit, perform operations, comprising:
monitoring cyber security detections reported via a cloud-computing environment by cyber security sensory agents monitoring client devices for maliciousness;
prior to a human expert cyber security assessment of the cyber security detection, pre-screening the cyber security detections by routing the cyber security detections via the cloud-computing environment to a cyber security detection prediction service;
comparing the cyber security detections to a cyber security assessment profile associated with the cyber security detection prediction service, the cyber security assessment profile generated by a machine learning model trained exclusively using historical behavioral event initial field identifiers assigned as normal operations by human expert cyber security assessment;
determining statistical conformances of the cyber security detections to the cyber security assessment profile associated with the cyber security detection prediction service;
receiving at least one of false positive detection predictions or true positive detection predictions as outputs generated by the cyber security detection prediction service that predicts the cyber security detections as true positive reports or as a false positive reports; and
in response to the true positive detection predictions, queuing the cyber security detections predicted as the true positive reports for the human expert cyber security assessment.

18. The memory device of claim 17, wherein the operations further comprise predicting a false positive report of the false positive reports.

19. The memory device of claim 17, wherein the operations further comprise predicting a true positive report of the true positive reports.

20. The memory device of claim 17, wherein the operations further comprise:
extracting humanly-assessed cyber security classification labels from the historical behavioral event identifiers; and
training the machine learning model using the humanly-assessed cyber security classification labels extracted from the historical behavioral event identifiers.

* * * * *